United States Patent [19]

Thompson et al.

[11] Patent Number: 5,256,191
[45] Date of Patent: Oct. 26, 1993

[54] CORRECTION FLUID COMPOSITIONS

[76] Inventors: John Thompson, 81 Pine St., Medfield, Mass. 02052; Kim H. Ng, 3 Annabell La., Franklin, Mass. 02038; Edward J. Ferguson, 6 Forest Rd., Foxboro, Mass. 02035

[21] Appl. No.: 769,861

[22] Filed: Oct. 1, 1991

Related U.S. Application Data

[63] Continuation-in-part of Ser. No. 606,961, Oct. 31, 1990, abandoned.

[51] Int. Cl.$^5$ .............................................. C09D 10/00
[52] U.S. Cl. ................................. 106/19 A; 106/285; 106/287.16; 106/287.19; 106/436
[58] Field of Search .................. 106/19, 20, 287.16, 106/285, 436, 287.19, 19 A

[56] References Cited

U.S. PATENT DOCUMENTS

| 3,276,870 | 10/1966 | Bitting | 106/19 |
| 3,674,729 | 7/1972 | Mirick | 260/23 AR |
| 3,997,498 | 12/1976 | Reese et al. | 260/33.8 VA |
| 4,165,988 | 8/1979 | Page et al. | 106/23 |
| 4,289,666 | 9/1981 | Creekmore | 400/696 |
| 4,654,081 | 3/1987 | Dalzell | 106/23 |
| 4,716,188 | 12/1987 | Mariusson et al. | 524/268 |
| 4,720,518 | 1/1988 | Chihara et al. | 524/267 |
| 4,732,614 | 3/1988 | Brooks et al. | 106/21 |
| 4,786,198 | 11/1988 | Zgambo | 401/142 |
| 4,795,783 | 1/1989 | Hunt | 525/101 |
| 5,009,708 | 4/1991 | Grünwald et al. | 106/105 |
| 5,062,891 | 11/1991 | Gruber et al. | 106/20 |

FOREIGN PATENT DOCUMENTS 604624 9/1960 Canada.
63142076 12/1986 Japan.
9097572 9/1988 Japan.

OTHER PUBLICATIONS

Grant & Hackh's Chemical Dictionary 5th edition. 1987 p. 360.
"TABS an enviro-friendly solvent" by John P. Webb, Pigment and Resin Technology, Jul. 1990.
"An Introduction to the Chemistry of the Silicones", Chapter 5, Eugene G. Rochow 2nd edition 1951.
"Principles of Polymer Chemistry", Chapter 2, Paul J. Flory, 1953.
"CRC Handbook of Solubility Parameters and Other Cohesion Parameters", Chapter 5, Alan F. M. Barton, 1991.
"Part-2 White Hiding Pigments" (Section A) from Pigments in Paint, Harold P. Preuss, 1974.
"Organosilicon Compounds", Chapter 8, C. Eaborn, 1960.
The Dow Corning Technical Data Sheet title "Information About Volatile Silicon Fluids", 1982.

Primary Examiner—Mark L. Bell
Assistant Examiner—Margaret Einsmann
Attorney, Agent, or Firm—Fish & Richardson

[57] ABSTRACT

Substantially non-toxic correction fluid compositions including an opacifying pigment dispersed in a solution of a solvent, a siloxane and a film-forming polymeric material.

58 Claims, No Drawings

CORRECTION FLUID COMPOSITIONS

CROSS REFERENCE TO RELATED APPLICATIONS

This application is a continuation-in-part of U.S. Ser. No. 07/606,961, filed Oct. 31, 1990 now abandoned.

BACKGROUND OF THE INVENTION

The invention relates to novel, improved correction fluid compositions. More precisely, this invention relates to novel, improved correction fluid compositions which have reduced potential for adverse effects on the environment and on health.

Correction fluid compositions (or correction fluids) for correcting handwritten, typewritten or photocopy markings on papers are known products of commerce and their performance characteristics are well defined. Essential performance characteristics include the ability to provide a film or coalesced residue on drying which can both effectively cover erroneous markings on a paper surface and receive a corrected marking. Preferably, the film covering the marking should be strongly bonded to the paper surface and should also be sufficiently flexible so that the film will not be removed under normal conditions of handling. Additionally, the correction fluid should not interact with the marking to cause excessive discoloration of the resulting film (bleeding). Another important performance characteristic involve the drying rate of the composition which should be as rapid as possible so that corrections can be made relatively quickly. Normally, commercial correction fluids form films which are sufficiently dry to receive a corrected marking in about 30-40 seconds. Other desired performance characteristics include good storage stability coupled with flow and viscosity characteristics which permit easy and even application of the fluid. Details relating to known correction fluids can be found in U.S. Pat. Nos. 3,276,870, 3,674,729; 3,997,498; 4,165,988 and 4,654,081.

As evidenced by the above-listed Patents, halogenated hydrocarbons have been the solvents of choice for correction fluid compositions. Halogenated hydrocarbon solvents presents special advantages primarily because they have evaporation rates which provide correction fluids which can dry rapidly and completely. Additionally, they do not interact with typewritten markings to cause unacceptable bleeding. Also, they can effectively dissolve those film forming polymeric materials which provide durable but flexible films without causing excessive cockling or distortion of paper surfaces. Despite their recognized advantages when used as correction fluid solvents, the use of halogenated hydrocarbon solvents has become a matter of increased concern primarily because of their adverse effect on the environment (stratospheric ozone depletion) and also because of their potential adverse effect on health through solvent abuse. Accordingly, the elimination of halogenated hydrocarbon solvents from correction fluids has become a primary objective for the art and significant efforts have been directed to the development of correction fluids free of halogenated hydrocarbon solvents.

Commercially available halogenated hydrocarbon-free correction fluids developed by the art have not proved to be completely satisfactory substitutes for correction fluids based on halogenated hydrocarbon solvents. Actually, only a relatively few non-halogenated hydrocarbon solvents have the desired combination of performance characteristics needed to qualify for use as correction fluid solvents. For example, heptane or cyclohexane and substituted derivatives thereof provide acceptable non-bleeding performance characteristics coupled with the capability to dissolve polymeric materials which provide the desired durable but flexible films. Moreover, non-halogenated hydrocarbon solvents are not entirely free of adverse effects on the environment and/or on health. Aqueous based correction fluids have also been developed and such fluids do not present any significant threat to the environment or to health. However, they can interact with aqueous based ink markings to cause unwanted bleeding and they also tend to cockle the surface of the paper carrying the marking. Accordingly, a need remains for the development of a halogenated hydrocarbon-free correction fluid which provides a combination of performance characteristics substantially similar to those provided by correction fluids based on halogenated hydrocarbon solvents. This invention is addressed to that need and provides an effective response to the need.

SUMMARY OF THE INVENTION

Correction fluid compositions of the invention are substantially non-toxic, rapid drying, film forming compositions.

In one aspect, the invention features a correction fluid composition that includes an opacifying pigment dispersed in a solution. The solution includes a volatile organosiloxane, an additional volatile solvent, and a film-forming polymeric material. The volume ratio of the organosiloxane and the solvent provides a mixture in which the $(\delta_{p+h})$ of the mixture is greater than about 2.0 cal$^{\frac{1}{2}}$cm$^{-3/2}$ (preferably 2.3 cal$^{\frac{1}{2}}$cm$^{-3/2}$), and less than about 7.35 cal$^{\frac{1}{2}}$cm and the latter value is not exceeded at least until about 90% of the mixture has evaporated.

In another aspect, the invention features a correction fluid composition that includes an opacifying agent dispersed in a solution of a volatile organosiloxane, a second volatile solvent, and a film-forming polymeric material. The composition has a drying time of less than 60 seconds.

Preferred organosiloxanes are those having the following formulae:

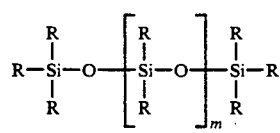

FORMULA A

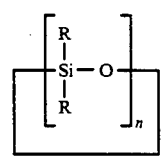

FORMULA B where each R is hydrogen or alkyl having from 1-3 carbon atoms, and m is 0, 1, or 2 and n is 4 or 5. Examples of the preferred organosiloxanes include hexamethyldisiloxane and octamethylcyclotetrasiloxane.

Preferred solvents include polar solvents like ethyl alcohol, isopropyl alcohol, methyl ethylketone, and ethyl acetate. Other preferred solvents include those having a ($\delta_{p+h}$) value between about 2.5 and 12.4 cal$^{\frac{1}{2}}$cm$^{-3/2}$. Preferably, the $\delta_p$ value of the organosiloxane-solvent mixture is greater than about 1.5 and less than about 3.6 cal$^{\frac{1}{2}}$cm$^{-3/2}$, and the $\delta_h$ value greater than about 1.3 and less than about 6.4 cal$^{\frac{1}{2}}$cm$^{-3/2}$.

Preferred film-forming polymeric materials include acrylic polymers, such as methyl methacrylate, butyl methacrylates, and isobutyl methacrylate, having a molecular weight of between 50,000 and 500,000.

In another aspect, the invention features a correction fluid including an opacifying agent dispersed in a solution including a film-forming polymeric material and a terpene e.g. a paramenthadiene solvent. Preferably the solution also includes a volatile organosiloxane.

Correction fluid compositions of the invention have excellent drying times as measured in accordance with the procedure described in detail later. The correction fluids are applied to a marking to be corrected such as by a brush or pen dispenser and do not undergo significant interaction with the marking to cause unacceptable discoloration (bleeding) of the fluid. On drying, the applied fluid provides a film or coalesced residue which can cover the marking and can receive a corrected marking. Additionally, the coalesced residue is durable and flexible and does not cockle or otherwise distort the paper surface.

DETAILED DESCRIPTION OF PREFERRED EMBODIMENTS

Those skilled in the art know that a variety of pigments can be included in a dispersion of a solvent and a film forming polymeric materials to provide correction fluid compositions. Substantially all correction fluid compositions include titanium dioxide as the opacifying pigment(s) to provide the basic white color which can be toned to provide a correction fluid composition closely corresponding to the color of the paper to which the composition is intended to be applied. Suitable titanium dioxide pigments include commercially available rutile titanium dioxides and anatase titanium dioxides or blends or mixtures of these which preferably have an average particle size between about 0.2 to about 0.4 microns and an average oil absorption of about 14 lbs. oil/100 lbs. pigment to about 36 lbs./100 lbs. The amount of titanium dioxide included in the composition can vary depending primarily on the degree of coverage desired. However, amounts between about 30 to about 60 percent by weight titanium dioxide based on the total weight of the composition are generally suitable. Other opacifying pigments may be used either alone but preferably in combination with the titanium dioxide. Such pigments include zinc sulfide, zinc oxide, and basic lead carbonate or sulphate. Colored pigments may also be used for matching the color of the correction composition to the color of the paper to which the composition is applied.

Siloxanes suitable in the practice of the invention are volatile, low viscosity, open or closed siloxane dimers, trimers, tetramers or pentamers. Preferred siloxanes reduce surface tension and promote leveling and are clear liquids which are essentially odorless, non-toxic, non-greasy and non-stringing and conform to the following formulae:

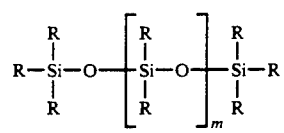

FORMULA A

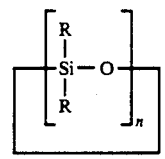

FORMULA B where each R is hydrogen or alkyl having from 1 to 3 carbon atoms and m is 0, 1 or 2 and n is 4 or 5. Particularly preferred siloxanes are alkyl substituted siloxanes and especially hexamethyldisiloxane and octamethylcyclotetrasiloxane. These especially preferred siloxanes are normally used in amounts between about 10 to about 40 percent by weight siloxane based on the total weight of the correction fluid composition.

Polymeric film forming materials suitable for use in correction fluid compositions of the invention are substantially completely soluble in the selected solvent mixture at room temperature. Particularly useful polymeric film forming materials are the medium to hard acrylic polymers such as methyl, butyl and isobutyl methacrylates having molecular weights between about 50,000 to about 500,000. Other suitable polymeric materials include vinyl polymers such as, copolymers of vinyl acetate and vinyl toluene or mixtures of these with the acrylic polymers. The amount of polymeric film forming material can vary but amounts between about 3 to about 10 percent by weight polymeric material based on the total weight of the correction fluid composition are normally suitable.

The amount of solvent(s) used in combination with the siloxane(s) is a critical feature of correction fluids of the present invention. If the amount of solvent is too low, the polymeric film forming material may not be sufficiently dissolved. On the other hand, if the amount of solvent is too high, the solvent may interact excessively with the marking producing unacceptable bleed. In accordance with the present invention, the solubility parameter(s) of the solvent(s)/siloxane(s) mixture is used to determine the appropriate amount of solvent needed to effectively dissolve the polymeric film forming material and provide minimal bleed. Essentially, the solubility parameter of a liquid is a function of three components: the dispersion component ($\delta_d$), the polar component ($\delta_p$) and the hydrogen bonding component ($\delta_h$). These components are related to the solubility parameter by the following equation:

$$\delta = \sqrt{\delta_d^2 + \delta_p^2 + \delta_h^2}$$

(the solubility parameter values are expressed in cal$^{\frac{1}{2}}$ cm$^{-3/2}$ units)

The polar and hydrogen bonding components of the solubility parameter can be combined in the following equation:

$$\delta_{p+h} = \sqrt{\delta_p^2 + \delta_h^2}$$

Accordingly, the solubility parameter of a selected solvent/siloxane mixture can be determined by the volume fraction $\phi$ of each component of the mixture as follows:

$\delta_d$ (mixture) = $(\phi\delta_d)$ siloxane + $(\phi\delta_d)$ polar solvent $\delta_p$ (mixture) = $(\phi\delta_p)$ siloxane + $(\phi\delta_p)$ polar solvent $\delta_h$ (mixture) = $(\phi\delta_h)$ siloxane + $(\phi\delta_h)$ polar solvent The solubility parameter components for the siloxane are calculated according to the method in A.F.M. Barton's CRC Handbook of Solubility Parameters pg. 82-87 (CRC Press 1983) assuming the same value for = - Si = and = C =. The solubility parameters for the solvents are obtained from Polymer Handbook, Second Edition, Part IV, page 348, Editors Brandrup & Immergut, Pub.: Wiley & Son 1975; to the extent the solubility parameter for particular solvents are not listed in the Polymer Handbook, they can be calculated according to the methods described in A.F.M. Barton's Handbook.

The following illustrates the manner of determining the solubility parameter of a 50/50 volume mixture of hexamethyldisiloxane (HMDS) and ethanol. All values are expressed in cal$^{\frac{1}{2}}$ cm$^{-3/2}$ units.

| Liquid | Component | | Solubility Parameter | | |
|---|---|---|---|---|---|
| | $\delta_d$ | $\delta_p$ | $\delta_h$ | $(\delta)$ | $(\delta_{p+h})$ |
| HMDS | 8.67 | 1.47 | 1.81 | 6.1 | — |
| Ethanol | 7.73 | 4.30 | 9.50 | 12.98 | 10.4 |
| 50/50 Mixture | 6.70 | 2.89 | 5.60 | 9.23 | 6.3 |

Based on bleed testing of a variety of siloxane/polar solvent mixtures we have found that siloxane/polar solvent mixtures in which the $(\delta_{p+h})$ value of the solubility parameter components of the mixture are less than about 7.35 cal$^{\frac{1}{2}}$ cm$^{-3/2}$ provide minimal bleed. Siloxane/solvent mixtures especially preferred for minimized bleed are those in which the $\delta_p$ and $\delta_h$ values of the solubility parameter components are less than about 3.6 and about 6.4 cal$^{\frac{1}{2}}$ cm$^{-3/2}$ respectively. Additionally, effective dissolution of the polymeric film forming material(s) is achieved in siloxane/solvent mixtures in which the $(\delta_{p+h})$ value of the solubility parameter components is greater than about 2.0, more preferably 2.3, cal$^{\frac{1}{2}}$ cm$^{-3/2}$ Especially effective dissolution of the polymeric film forming material(s) is achieved when the values of the $\delta_p$ and $\delta_h$ solubility parameter components are greater than about 1.5 and 1.8 cal$^{\frac{1}{2}}$ cm$^{-3/2}$ respectively. Furthermore, the value of $(\delta_{p+h})$ should not exceed about 7.35 cal$^{\frac{1}{2}}$ cm$^{-3/2}$ and the values of the $\delta_p$ and $\delta_h$ solubility parameter components of the mixture should not exceed about 3.6 and 6.4 cal$^{\frac{1}{2}}$ cm$^{-3/2}$ respectively until about 90% of the solvent mixture has evaporated in order to minimize bleed. If the evaporation rate of the solvent is slower than the evaporation rate of the siloxane, a non-polar, slow evaporating solvent such as mineral spirits may be added to the mixture to maintain the values of $(\delta_{p+h})$, $\delta_p$ and $\delta_h$ Within this specified range.

Preferred polar solvents are those having a solubility parameter between about 7.2 to about 14 cal$^{\frac{1}{2}}$ cm$^{-3/2}$ and where the value of $(\delta_{p+h})$ of the solvent is between about 3.5 to about 12.4 cal$^{\frac{1}{2}}$ cm$^{-3/2}$. Especially preferred polar solvents have boiling points between about 60° to about 110° C. and include volatile alcohols, ketones and esters such as ethyl and isopropyl alcohol, methyl ethyl ketone and ethyl acetate. The amount of polar solvent used in the siloxane/solvent mixtures should be sufficient to provide a correction fluid having free flow characteristics so that the fluid can be applied to a marking with a brush and provide a relatively thin film covering the marking. Representative suitable amounts of the preferred solvents are between about 10 to about 30 percent by weight solvent based on the total weight of the correction fluid composition.

In addition to the four basic components of the correction fluid compositions, i.e., the opacifying pigment, siloxane, polymeric film forming material and solvent the compositions may include a plasticizer, which is preferably soluble in the solvent. The plasticized be used to reduce embrittlement and improve adhesion and flexibility of the film formed by the composition thereby minimizing chipping off or flaking of the film. Suitable specific plasticizers include di-(2-ethylhexyl) phthalate, dioctyl phthalate, dibutyl phthalate, low molecular weight polystyrene, mineral oil, tricresyl phosphate, and castor oil. Amounts of plasticizer between about 0 to 5 parts by weight are normally employed. However, somewhat more or less can be used if needed or desired.

A dispersing agent(s) or surfactant may also be employed in the correction compositions of the present invention if needed to stabilize the composition or to assure that the covering power provided by the pigment(s) is substantially evenly distributed throughout the dispersion. Suitable commercially available dispersing agents include those sold under the trade names NUOSPERSE 700 and AEROSOL OTS sold by Huls America Inc. and American Cyanamide Co. respectively, and the amounts used can vary but amounts between 0 to about 5 percent by weight of the composition are normally employed.

Other additive materials which can be included in the correction compositions are toners such as a selected grade of carbon black to obtain the desired shade of white. Other toners such as colored pigments or dyes can be suitably employed to obtain compositions of desired colors for use on correspondingly colored papers. Additionally, effective amounts of thickening agents can be employed as thixotropic agents to control settling of the dispersed materials. Amounts of thickening agents between about 0 to about 5 percent by weight are normally suitable.

Representative correction fluid compositions of the present invention are set out in Table 1 below.

TABLE 1

| Ingredient | Range (% by wt.) | Preferred Range (% by wt.) |
|---|---|---|
| Pigment(s) | 30–60 | 45–55 |
| Siloxane(s) | 10–40 | 15–35 |
| Polymeric Material(s) | 3–10 | 5–8 |
| Solvent(s) | 10–30 | 12–25 |
| Plasticizer(s) | 0–5 | 0–2 |
| Dispersing Agent(s) | 0–5 | 0–2 |
| Thickening Agent(s) | 0–5 | 0–2 |

Correction fluid compositions of the invention can be prepared by agitating or shaking a mixture of the siloxane, the film forming polymeric material and the solvent until the polymeric material is dissolved. The opacifying pigment and other ingredients such as plasticizer, dispersing agent and the thickening agent are then added to the dispersion of siloxane in the polymeric material/solvent solution and the ingredients are subjected to high speed agitation or shaking to provide the final correction fluid composition.

The invention as well as details relating to the invention will be more fully appreciated by reference to the following illustrative, non-limiting Example which describes preferred correction fluid compositions of the invention and the manner for preparing the correction fluid compositions.

EXAMPLE

The correction fluid compositions of this Example were prepared in accordance with the following procedure:

1. Add siloxane, polymeric film forming material and solvent to a can (500 mls.)
2. Cover can and shake on paint shaker until polymeric material is dissolved (1 hour).
3. Add titanium dioxide pigment, plasticizer and/or dispersants to the step 2 dispersion.
4. Mix the ingredients at high speed (1000-1500 rpm) for ten minutes.
5. Place step 4 dispersion in can and add enough glass beads to the dispersion so that the glass beads represent about one-third of the volume of the dispersion.
6. Cover the can and shake on paint shaker until the pigment fineness achieves a grind of 4. (20 minutes).
7. Filter out beads and, if needed, add small amount of colorant to adjust the tint of the fluid.
8. Add siloxane and/or solvent to adjust % of nonvolatiles (optional).

| INGREDIENT | PERCENT BY WEIGHT | | | | |
|---|---|---|---|---|---|
| | 1 | 2 | 3 | 4 | 5 |
| Titanium Dioxide[1] | 51.65 | 52.09 | 50.84 | 50.34 | 50.17 |
| Hexamethyldisiloxane | — | — | 16.11 | 15.62 | 7.85 |
| Octamethylcyclotetrasiloxane | 15.79 | 15.58 | — | — | 7.85 |
| Polymeric Material[2] | 7.06 | 7.12 | 6.95 | | |
| Polymeric Material[3] | — | — | — | 6.88 | 6.86 |
| Isopropanol (Solvent) | 23.68 | 23.78 | 24.25 | 24.43 | 23.55 |
| Methylethyl Ketone (Solvent) | — | 23.28 | — | — | — |
| Plasticizer[4] | 1.82 | 1.83 | 1.79 | 1.77 | 1.76 |
| AEROSOL OTS[5] | — | — | — | 0.98 | 1.96 |
| NUOSPERSE[6] | — | — | — | 0.98 | — |

[1] Sold by E. I. DuPont de Nemours & Co. under the trade name Ti PURE 901.
[2] Medium hard polymers based on polyisobutyl methacrylate sold by Rohm Technology Inc. under the trade name PLEXIGUM P28.
[3] Medium hard polymers based on polyisobutyl methacrylate and sold by Rohm Technology Inc. under the trade name PLEXIGUM P675.
[4] Di-(2-ethylhexyl) phthalate.
[5] Sodium dioctyl sulfosuccinate sold by American Cyanamid Company.
[6] A phosphate surfactant sold by Huls America Incorporated.

This drying time of each of the correction fluids of this Example is the time measured between the application (or dotting) of a correction fluid to a marking with a brush and obtaining an acceptable correction (or typeover) on the film formed by the composition. An acceptable correction or typeover is a typewritten marking applied to the film formed by the correction fluid and which is without any observable voids in the marking. The procedure for determining the drying time of the fluid is as follows:

1. Prepare a bottle of each fluid to be tested and shake well before using.
2. Type the word HNLLO on a sheet of paper using an IBM correctable ribbon.
3. Immerse a correction fluid brush into the fluid and wipe the brush on the neck of the bottle three times.
4. Apply (or dot) the fluid over the N.
5. Using a stop watch, type the letter E over the applied fluid 20 seconds after application of the fluid.
6. Examine the corrected marking to determine if the marking is free of voids.
7. Repeat steps [2-6] three additional times.
8. If the corrected marking in three of the four procedures is free of voids, record the time (20 seconds) as the drying time.
9. If two or more markings have voids, repeat steps [2-7] but increase the time of step 5 by five (5) seconds until three out of four corrected markings made at the same time are free of voids and record that time as the drying time.

Note: Fresh bottles of the correction fluids should be used in the above drying time determination and the determination should be made on the same day and not carried over to the next day.

The viscosities of the correction fluids of this Example were measured on a Brookfield Viscometer, Model RVT using the No. 2 spindle inserted into the fluid at an angle of approximately 45° at 20 rpm. After five revolutions, the dial indicator was locked into position and the viscometer was turned off. Viscosity in cps =dial reading ×20; (spindle No. 2, 20 rpm). The temperature of the fluid was measured immediately after the viscosity measurement.

Table 2 summarizes the calculated solubility parameters expressed in $cal^{\frac{1}{2}} \ cm^{-3/2}$, the measured drying times and viscosities of the correction fluid compositions.

TABLE 1

| | 1 | 2 | 3 | 4 | 5 |
|---|---|---|---|---|---|
| p | 2.6 | 3.5 | 2.4 | 2.4 | 2.5 |
| h | 6.2 | 2.7 | 5.5 | 5.5 | 5.8 |
| $(\delta_{p+h})$ | 6.7 | 4.4 | 6.0 | 6.0 | 6.3 |
| Drying time (sec) | 56 | 50-60 | 35 | 30 | 45 |
| Viscosity (cps) 22° C. | 280 | 140 | 170 | 300 | 100 |

A non-polar solvent can also be used in combination with siloxane, provided the mixture of solvents will sufficiently dissolve the polymeric film forming material. The preferred non-polar solvents are terpenes, which are $C_{10}H_{16}$ hydrocarbons, some of which have conjugated doublebonds. The preferred terpenes are low in toxicity and environmentally friendly. Terpenes generally have a $\delta_p$ value of above 2.8, and the more preferred polymeric materials are soluble in mixtures of siloxanes and terpenes. The most preferred terpenes, sold under the tradename "TABS" by Union Camp Corp., in Jacksonville, Fla. is a mixture of 95% para-methadienes and 5% other terpene hydrocarbons. TABS has a boiling point of 165° C., which means it is sufficiently volatile so that, when it is used in small quantities in mixtures also containing volatile siloxanes, it will evaporate sufficiently fast to provide a quick-drying fluid.

Representative examples of compositions that include terpenes as the volatile solvent include the following two formulations:

|  | Formula 1 % WT | Formula 2 % WT |
| --- | --- | --- |
| HMDS | 34.18 | 28.77 |
| TABS | 7.02 | 11.19 |
| Rohagum PQ610[1] | 12.21 | 6.99 |
| Dibutyl phthalate[2] | 1.83 | 1.80 |
| Lamp Black | 0.09 | 0.09 |
| Ti PURE R 931 (TiO2)[3] | 44.76 | 51.15 |
|  | 100% | 100% |

[1] A polyisobutyl methacrylate by Rohm Technology, Inc.
[2] Sold by Eastman Kodak Co.
[3] Sold by E. I. DuPont de Nemours & Co.

These compositions, like the prior examples, exhibit good drying times (less than 60 seconds) and did not cause excessive bleeding of the mark.

From the foregoing description, it should be apparent that the present invention provides an effective response to the need for correction fluids having reduced effects on the environment and health. The distinctive feature of the correction fluids involves the use of siloxanes as substitutes for the halogenated and non-halogenated hydrocarbon solvents of prior art correction fluids. The use of the siloxanes provides a correction fluid presenting a significantly lower level of risk to the environment and health. Additionally, the correction fluids of the present invention provide an especially desirable combination of performance characteristics in terms of rapid drying, minimal interaction (non-bleeding) with markings and the capability to provide durable but flexible films which can effectively cover the marking and receive a new marking without cockling or other distortion of the paper surface. Accordingly, the invention provides novel, improved correction fluids and methods for correcting markings which are significantly different from those known to the art at the time the invention was made.

Other embodiments are within the following claims.

We claim:

1. A correction fluid composition comprising an opacifying pigment dispersed in a solution of a film-forming polymeric material and a volatile organosiloxane in a volatile solvent and where the volume ratio of the organosiloxane and the solvent provide an organosiloxane solvent mixture in which the value of the $(\delta_{p+h})$ of the mixture is greater than about 2.0 cal$^{\frac{1}{2}}$ cm$^{-3/2}$ and less than about 7.35 cal$^{\frac{1}{2}}$ cm$^{-3/2}$ and the higher value is not exceeded at least until about 90 percent of the mixture has evaporated.

2. A correction fluid of claim 1 wherein said solvent has a $(\delta_{p+h})$ value between 2.5 to about 12.4 cal$^{\frac{1}{2}}$cm$^{-3/2}$.

3. A correction fluid of claim 1 where in said $(\delta_{p+h})$ of said mixture is greater than about 2.3 cal$^{\frac{1}{2}}$ cm$^{-3/2}$.

4. A correction fluid composition of claim 3 wherein the values of the solubility parameter components of said mixture are greater than about 1.5 and less than about 3.6 cal$^{\frac{1}{2}}$ cm$^{-3/2}$ for $\delta_p$ and greater than about 1.8 and less than about 6.4 cal$^{\frac{1}{2}}$ cm$^{-3/2}$ for $\delta_h$.

5. A correction fluid of claim 3 where the solvent has a solubility parameter between about 7.2 to about 14 cal$^{\frac{1}{2}}$ cm$^{-3/2}$ and a $(\delta_{p+h})$ value between about 3.5 to about 12.4 cal$^{\frac{1}{2}}$ cm$^{-3/2}$.

6. A correction fluid of claim 5 where the concentration of opacifying pigment is between about 30 to about 60 percent by weight of the total weight of the composition, the concentration of organosiloxane is between about 10 to about 40 percent by weight, the concentration of polymeric material is between about 3 to about 10 percent by weight and the concentration of solvent is between about 10 to about 30 percent by weight.

7. A correction fluid of claim 6 where the concentration of opacifying pigment is between about 45 to about 55 percent by weight of the total weight of the composition, the concentration of organosiloxane is between about 15 to about 35 percent by weight, the concentration of polymeric material is between about 5 to about 8 percent by weight and the concentration of solvent is between about 12 to about 25 percent by weight.

8. A correction fluid of claim 7 where the organosiloxane conforms to the following formulae:

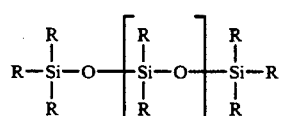

FORMULA A

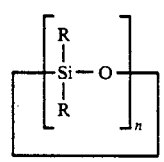

FORMULA B where each R is hydrogen or alkyl having from 1-3 carbon atoms, and m is 0, 1, or 2 and n is 4 or 5.

9. A correction fluid of claim 8 where the polymeric material is an acrylic polymer having a molecular weight between 50,000 and 500,000.

10. A correction fluid of claim 9 where the solvent is a volatile alcohol, ketone or ester or mixtures of these.

11. A correction fluid of claim 10 where the organosiloxane is hexamethyldisiloxane or octamethylcyclotetrasiloxane or mixtures of these.

12. A correction fluid of claim 11 where the polymeric material is methyl methacrylate, butyl methacrylate, isobutyl methacrylate or mixtures of these.

13. A correction fluid of claim 12 where the solvent is ethyl alcohol, isopropyl alcohol, methyl ethyl ketone, ethyl acetate or mixtures of these.

14. A correction fluid of claim 13 where the organosiloxane is hexamethyldisiloxane, the polymeric material is an isobutylmethacrylate and the solvent is isopropyl alcohol.

15. A correction fluid of claim 13 where the organosiloxane is octamethylcyclotetrasiloxane, the polymeric material is an isobutylmethacrylate and the solvent is isopropyl alcohol.

16. A correction fluid of claim 1 where the mixture of said solvent and said organosiloxane has a $\delta_p$ value of greater than about 1.6.

17. A correction fluid of claim 16 where the solvent comprises a terpene.

18. A method for producing a corrective coating on the surface of a substrate, said method comprising the steps of:

a. providing a composition including an opacifying pigment dispersed in a solution of a film-forming polymeric material and a volatile organosiloxane in a volatile solvent and where the volume ratio of the organosiloxane and the solvent provide an organosiloxane solvent mixture in which the value of the $(\delta_{p+h})$ of the mixture is greater than about 2.0 cal$^{\frac{1}{2}}$ cm$^{-3/2}$ and less than about 7.35 cal$^{\frac{1}{2}}$ cm$^{-3/2}$ and the higher value is not exceeded at least until about 90 percent of the mixture has evaporated, b. applying said composition to a marking on the surface of a substrate to cover said marking;

c. allowing said volatile organosiloxane and said volatile solvent to evaporate to form a film comprising said film-forming polymeric material covering said marking.

19. The method of claim 18 wherein said solvent has a $(\delta_{p+h})$ value of between about 2.5 to about 12.4 cal$^{\frac{1}{2}}$cm$^{-3/2}$.

20. The method of claim 18 where in said composition provided said $(\delta_{p+h})$ of said mixture is greater than about 2.3 cal$^{\frac{1}{2}}$cm$^{-3/2}$.

21. The method of claim 20 where in said composition provided the values of the solubility parameter components of said mixture are greater than about 1.5 and less than about 3.6 cal$^{\frac{1}{2}}$ cm$^{-3/2}$ for $\delta_p$ and greater than about 1.8 and less than about 6.4 cal$^{\frac{1}{2}}$ cm$^{-3/2}$ for $\delta_h$.

22. The method of claim 20 where in said composition provided said volatile solvent has a solubility parameter between about 7.2 to about 14 cal$^{\frac{1}{2}}$ cm$^{-3/2}$ and a $(\delta_{p+h})$ value between about 3.5 to about 12.4 cal$^{\frac{1}{2}}$ cm$^{-3/2}$.

23. The method of claim 20 where in said composition provided the concentration of opacifying pigment is between about 30 to about 60 percent by weight of the total weight of the composition, the concentration of organosiloxane is between about 10 to about 40 percent by weight, the concentration of polymeric material is between about 3 to about 10 percent by weight and the concentration of solvent is between about 10 to about 30 percent by weight.

24. The method of claim 20 where in said composition provided the concentration of opacifying pigment is between about 45 to about 55 percent by weight of the total weight of the composition, the concentration of organosiloxane is between about 15 to about 35 percent by weight, the concentration of polymeric material is between about 5 to about 8 percent by weight and the concentration of solvent is between about 12 to about 25 percent by weight.

25. The method of claim 20 wherein the organosiloxane conforms to the following formulae:

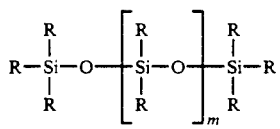

FORMULA A

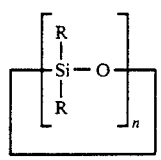

FORMULA B where each R is hydrogen or alkyl having from 1-3 carbon atoms, and m is 0, 1, or 2 and n is 4 or 5.

26. The method of claim 20 where in said composition provided the polymeric material is an acrylic polymer having a molecular weight between 50,000 and 500,000.

27. The method of claim 20 where in said composition provided the solvent is a volatile alcohol, ketone or ester or mixtures of these.

28. The method of claim 20 where in said composition provided the organosiloxane is hexamethyldisiloxane or octamethylcyclotetrasiloxane or mixtures of these.

29. The method of claim 20 where in said composition provided the polymeric material is methyl methacrylate, butyl methacrylate, isobutyl methacrylate or mixtures of these.

30. The method of claim 20 where in said composition provided the solvent is ethyl alcohol, isopropyl alcohol, methyl ethyl ketone, ethyl acetate or mixtures of these.

31. The method of claim 20 where in said composition provided the organosiloxane is hexamethyldisiloxane, the polymeric material is an isobutylmethacrylate and the solvent is isopropyl alcohol.

32. The method of claim 20 where in said composition provided the organosiloxane is octamethylcyclotetrasiloxane, the polymeric material is an isobutylmethacrylate and the solvent is isopropyl alcohol.

33. The method of claim 18 where said solvent comprises a non-polar solvent.

34. The method of claim 33 where in said composition provided the solvent comprises a terpene.

35. A correction fluid composition comprising an opacifying pigment dispersed in a solution of a volatile solvent, a volatile organosiloxane and a film-forming polymeric material, said composition having a drying time of less than 60 seconds.

36. The correction fluid of claim 35 where the concentration of opacifying pigment is between about 30 to about 60 percent by weight of the total weight of the composition, the concentration of organosiloxane is between about 10 to about 40 percent by weight, the concentration of polymeric material is between about 3 to about 10 percent by weight and the concentration of solvent is between about 10 to about 30 percent by weight.

37. The correction fluid of claim 35, wherein said solvent is a terpene.

38. A correction fluid of claim 36 where the concentration of opacifying pigment is between about 45 to about 55 percent by weight of the total weight of the composition, the concentration of organosiloxane is between about 15 to about 35 percent by weight, the concentration of polymeric material is between about 5 to about 8 percent by weight and the concentration of solvent is between about 12 to about 25 percent by weight.

39. A correction fluid of claim 36 where the solvent comprises a non-polar solvent.

40. A correction fluid of claim 35 where the organosiloxane conforms to the following formulae:

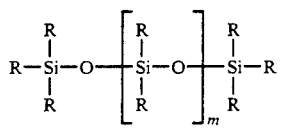

FORMULA A

-continued

FORMULA B

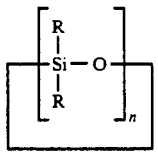

where each R is hydrogen or alkyl having from 1-3 carbon atoms, and m is 0, 1, or 2 and n is 4 or 5.

41. A correction fluid of claim 35 where the polymeric material is an acrylic polymer having a molecular weight between 50,000 and 500,000.

42. A correction fluid of claim 35 where the solvent is a volatile alcohol, ketone or ester or mixtures of these.

43. A correction fluid of claim 35 where the organosiloxane is hexamethyldisiloxane or octamethylcyclotetrasiloxane or mixtures of these.

44. A correction fluid of claim 43 where the polymeric material is methyl methacrylate, butyl methacrylate, isobutyl methacrylate or mixtures of these.

45. A correction fluid of claim 44 where the solvent is ethyl alcohol, isopropyl alcohol, methyl ethyl ketone, ethyl acetate or mixtures of these.

46. A correction fluid of claim 45 where the organosiloxane is hexamethyldisiloxane, the polymeric material is an isobutylmethacrylate and the solvent is isopropyl alcohol.

47. A correction fluid of claim 45 where the organosiloxane is octamethylcyclotetrasiloxane, the polymeric material is an isobutylmethacrylate and the solvent is isopropyl alcohol.

48. A method for providing a corrective coating, suitable for receiving a corrective marking, on the surface of a paper substrate, said method comprising the steps of:
 a. providing a composition comprising an opacifying pigment dispersed in a solution of a volatile polar solvent, a volatile organosiloxane and a film-forming polymeric material, said composition having a drying time of less than 60 seconds;
 b. applying said composition to a marking on the surface of a paper substrate to cover said marking; and
 c. allowing said volatile organosiloxane and said volatile solvent to evaporate to form a film comprising said film-forming polymeric material covering said marking.

49. The method of claim 48, comprising the additional step of applying a corrected marking to said film.

50. The method of claim 49 where said solvent comprises a polar solvent.

51. A correction fluid composition comprising an opacifying agent dispersed in a solution comprising a film-forming polymeric material and a volatile terpene solvent, said film-forming polymeric material being capable of forming a durable film on a paper substrate at room temperature within 60 seconds after said correction fluid composition is applied to said paper substrate.

52. The correction fluid composition of claim 51 where said terpene is a paramenthadiene.

53. The correction fluid composition of claim 51, wherein said solution further comprises volatile organosiloxane.

54. A correction fluid of claim 53 where the concentration of opacifying pigment is between about 30 to about 60 percent by weight of the total weight of the composition, the concentration of organosiloxane is between about 10 to about 40 percent by weight, the concentration of polymeric material is between about 3 to about 15 percent by weight and the concentration of terpene is between about 5 to about 30 percent by weight.

55. The correction fluid composition of claim 54 where said terpene is paramenthadiene.

56. A method for providing a corrective coating on the surface of a paper substrate, said method comprising the steps of:
 a. providing a composition comprising an opacifying pigment dispersed in a solution that includes a volatile terpene solvent and a film-forming polymeric material;
 b. applying said composition to a marking on the surface of a paper substrate to cover said marking; and
 c. allowing said volatile terpene to evaporate to form a film comprising said film-forming polymeric material covering said marking.

57. The method of claim 56, comprising the additional step of applying a corrected marking to said film.

58. The correction fluid of claim 51 wherein said opacifying pigment is titanium dioxide.

* * * * *

UNITED STATES PATENT AND TRADEMARK OFFICE
CERTIFICATE OF CORRECTION

PATENT NO. : 5,256,191

DATED : October 26, 1993

INVENTOR(S) : John Thompson, Kim H. Ng and Edward J. Ferguson

It is certified that error appears in the above-identified patent and that said Letters Patent are hereby corrected as shown below:

Column 1, line 30, delete "involve" and insert --involves--;

Column 2, line 37, delete "cm" and insert --$cm^{-3/2}$--

Column 3, line 15, after "terpene" insert --solvent--;

Column 3, line 15 after "paramenthadiene" delete "solvent";

Column 6, line 17, delete "plasticized" and insert --plasticizer can--;

Column 8, line 39, delete "TABLE 1" and insert --TABLE 2--; and

Column 8, line 59, delete "methadienes" and insert --menthadienes--.

UNITED STATES PATENT AND TRADEMARK OFFICE
CERTIFICATE OF CORRECTION

PATENT NO. : 5,256,191

DATED : October 26, 1993

INVENTOR(S) : John Thompson, et al.

It is certified that error appears in the above-identified patent and that said Letters Patent is hereby corrected as shown below:

Claim 25, column 11, line 46, delete "wherein" and insert --where--.

Signed and Sealed this

Thirtieth Day of August, 1994

Attest:

BRUCE LEHMAN

Attesting Officer

Commissioner of Patents and Trademarks